US007328174B2

(12) United States Patent
Baratz

(10) Patent No.: US 7,328,174 B2
(45) Date of Patent: Feb. 5, 2008

(54) SALES ENHANCEMENT SYSTEM AND METHOD FOR RETAIL BUSINESSES

(75) Inventor: Shy Baratz, Ramat Gan (IL)

(73) Assignee: Motivia Ltd., Ramat Gan (IL)

( * ) Notice: Subject to any disclaimer, the term of this patent is extended or adjusted under 35 U.S.C. 154(b) by 467 days.

(21) Appl. No.: 10/470,950

(22) PCT Filed: Feb. 5, 2002

(86) PCT No.: PCT/IL02/00098

§ 371 (c)(1),
(2), (4) Date: Aug. 5, 2003

(87) PCT Pub. No.: WO02/063411

PCT Pub. Date: Aug. 15, 2002

(65) Prior Publication Data

US 2004/0054585 A1 Mar. 18, 2004

(51) Int. Cl.
G06Q 30/00 (2006.01)
G06F 17/30 (2006.01)
(52) U.S. Cl. .............................. 705/26; 705/14; 705/27
(58) Field of Classification Search .................... 705/1, 705/26–27, 14
See application file for complete search history.

(56) References Cited

U.S. PATENT DOCUMENTS 4,638,312 A * 1/1987 Quinn et al. .................. 340/5.9
5,053,868 A * 10/1991 Higgins et al. .............. 348/150
5,128,862 A * 7/1992 Mueller ........................ 705/15

(Continued)

FOREIGN PATENT DOCUMENTS

JP 07028886 A * 1/1995

OTHER PUBLICATIONS

"Check this out". Hardesty,Greg. Outdoor Retailer. Aug. 2000. vol. 20, Iss. 8; p. 92, 3 pgs. [receovered from Proquest database Sep. 8, 2006].*
"Vendors seek to become checkstand media moguls". Neff, Jack. Advertising Age. Mar. 6, 2000. vol. 71, Iss. 10; p. 36, 1 pgs. [receovered from Proquest database Sep. 8, 2006].*
"Touch IND: Touc Industires, Inc., Announces ilnform". Business Wire, May 12, 1998/ [recovered from DIALOG database on Aug. 13, 2007].*

Primary Examiner—Jeffrey A. Smith
Assistant Examiner—William J. Allen
(74) Attorney, Agent, or Firm—Mark M. Friedman

(57) ABSTRACT

A sales enhancement system for retail businesses including: (a) an input mechanism for inputting (408, 413), into the system, selection information on a plurality of items selected by a patron, the information on each item including: (i) at least on item type, each item type belonging to an associated item category among a plurality of item categories, and (ii) a number of units associated with each item type; (b) a memory for storing (409, 414) said selection inforamtion; (c) a display (407, 412) having a plurality of display elements arranged in a matrix, wherein each element of the display elements represents a single unit, the display designed and configured such that: (i) each item type is positioned within a single column of a plurality of columns in the matrix, each column corresponding to one of the item categories, and (ii) filled and empty elements of the display elements are visually differentiated.

46 Claims, 4 Drawing Sheets

U.S. PATENT DOCUMENTS

| | | | |
|---|---|---|---|
| 5,168,354 A * | 12/1992 | Martinez et al. | 348/150 |
| 5,308,120 A * | 5/1994 | Thompson | 283/70 |
| 5,353,219 A * | 10/1994 | Mueller et al. | 705/16 |
| 5,806,071 A * | 9/1998 | Balderrama et al. | 707/104.1 |
| 5,912,743 A * | 6/1999 | Kinebuchi et al. | 358/442 |
| 6,003,015 A * | 12/1999 | Kang et al. | 705/15 |
| 6,119,099 A * | 9/2000 | Walker et al. | 705/16 |
| 6,694,300 B1 * | 2/2004 | Walker et al. | 705/14 |
| 2001/0047302 A1 * | 11/2001 | Yoshinaga et al. | 705/15 |
| 2004/0044627 A1 * | 3/2004 | Russell et al. | 705/50 |

* cited by examiner a. At the beginning of the order b. After a sale of a burger c. After the sale of the 2nd burger d. After the sale of a cola e. At the end of the order f. With a no. of patrons and mark g. With success points h. With a special message i. With row points accumulation column

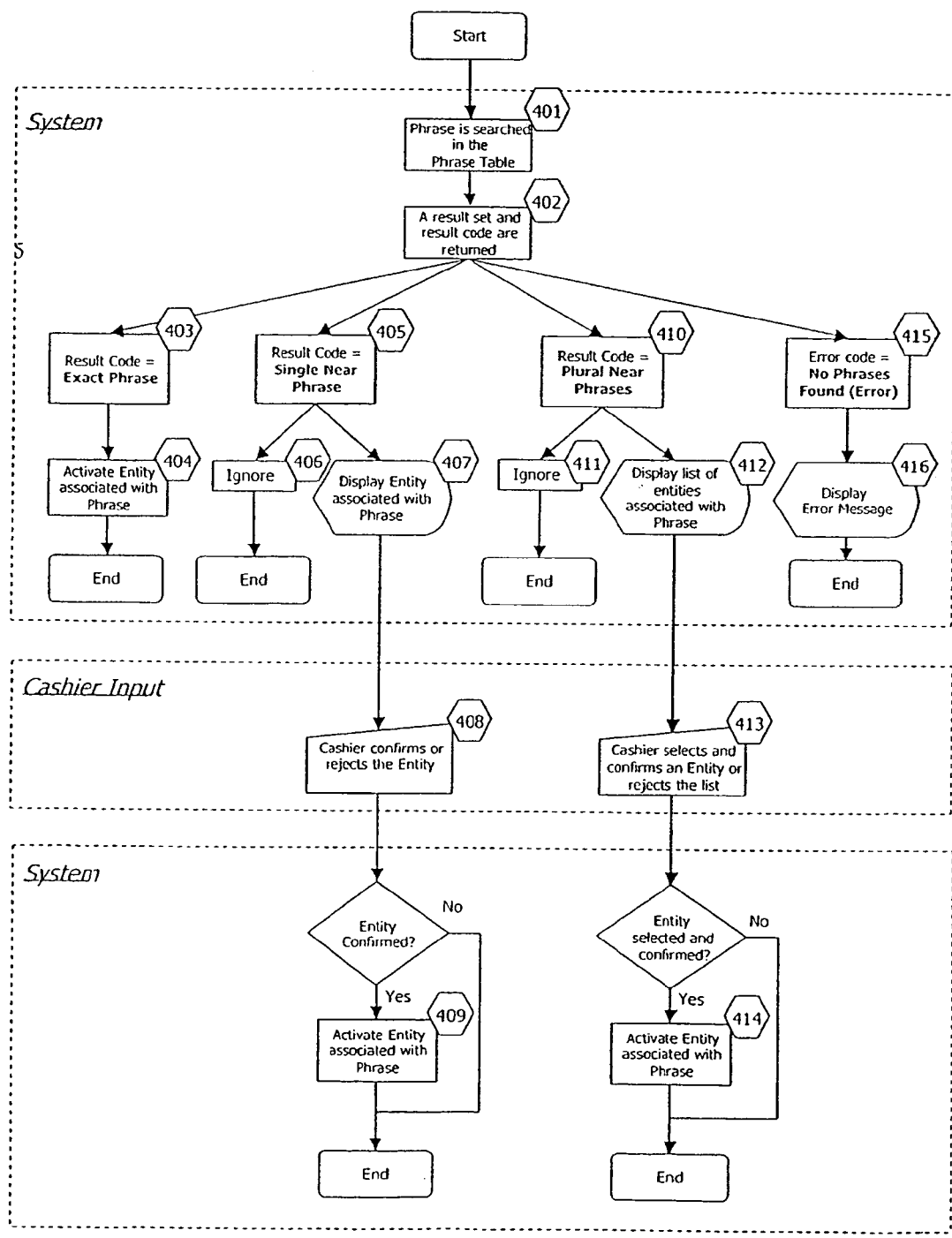

SALES ENHANCEMENT SYSTEM AND METHOD FOR RETAIL BUSINESSES

FIELD AND BACKGROUND OF THE INVENTION

The present invention relates to a system for, and method of sale enhancement for retail businesses, and in particular for sales enhancement of products such as fast foods, which are of different types, yet are related to each other, so as to construct a family set or a kit.

Although the present invention applies to various retail businesses and environments, the description provided herein centers around the fast food restaurant industry.

As used herein in the specification and in the claims section that follows, the term "Patron" refers to a customer, particularly to a restaurant customer; the term "Sale" is used herein in place of the more common term "order" to distinguish between a request made by a customer and the manner in which items are arranged or sorted; the term "Sale Terminals" includes cash registers, electronic cash registers (ECR's) and Point of Sale (POS) terminals.

While fast food restaurants and outlets specialize in specific food items, such as hamburgers, doughnuts, pizzas, and the like, such restaurants typically sell various side items and dishes, such as beverages, French fries, salads and various desserts, all of which constitute a source of additional revenue.

As competition in the business grows, acquiring new patrons is becoming more difficult, and restaurant managements are looking for ways to increase the sale per patron. It is highly desirable to interest patrons in purchasing additional and larger, more profitable items (also known as up-selling). This is typically achieved by offering promotions in the form of combination meals at a special, reduced price, and by training cashiers to encourage patrons to order such combination meals, additional items and larger portions.

Often only a small degree of persuasion is necessary to get the patron to increase his order. However, the cashiers that could potentially realize these extra sales are usually young, inexperienced and have little motivation. Although frequently trained and constantly coached to offer additional items or prompt for larger portions, such motivation fades rapidly away and the effort spent on their coaching is essentially wasted.

Most cashiers can hardly remember the item sold after the item has been entered to the Sale Terminal, but the full picture is important in realizing sales of additional items. According to the prior art, cashiers look at the printed tickets of the sale-order. The sale-orders are printed the way they are ordered, and in order to compare, for instance, the number of main courses to the number of beverages, the cashier has to go through the ticket. This is slow and tedious, and consequently, cashiers rarely perform this function properly, if at all. Some newer prior art systems display the list of items as a metaphor of the printed ticket on the screen, and so the cashier does not have to examine tickets. More advanced systems use the displayed ticket as an input device, so that the displayed items can be selected by pointing at them with a mouse or a touch and the cashier can then act on the selected item (delete, enlarge, etc.).

According to the prior art, the data entry methods used by many restaurant systems often combine the type of menu item with size or flavor descriptions ("modifiers"). These methods are based on a simple arithmetic algorithm that uses a set of arithmetic factors that add up to an item of a Price Look Up (PLU) number.

A restaurant may sell three beverage types: Cola, Sprite and Fanta, all of which are available in four sizes: Regular, Small and Large and in two nutritional values: Regular and Diet.

The restaurant assigns values to the various terms as follows:

| | | |
|---|---|---|
| Cola - 1000; | Sprite - 2000; | Fanta - 3000; |
| Regular - 0; | Small - 100; | Large - 200; |
| Diet - 10. | | |

To get to the specific menu item, one must add up all the numbers assigned to the terms that define it, for example:
Regular Cola=1000+0=1000
Regular Diet Cola=1000+0+10=1010
Large Diet Fanta=3000+200+10=3210.

The system dictates the PLU number-structure and has many disadvantages, mostly associated with inflexibility. For example, such systems do not support partial data entry.

Touch screens are extensively used, in the prior art, for POS terminals in various industries, especially in table service and fast food restaurants.

Conventional touch screens provide superb band-eye coordination, but provide neither tactile nor kinesthetic feedback. Consequently, the use of touch screens forces the cashier to look at the screen while operating. The need to look and concentrate on the screen causes the cashier to lose eye contact with the patron and thus interfere with the up-selling process. The software senses when the screen is touched and when the touch terminates (lifted), and the exact location of the touch or the lifting. The screen is divided for this purpose into touch areas, also known as buttons.

In these, prior art, touch-sensitive applications, systems use touches in these button-areas as cues to some action or function, starting with single entry of a character or a digit through invocation of large software modules. The set of touch, lift and location at the touch-area or in a close vicinity (the maximum distance between all these events being less than a pre-set parameter) is usually considered to be a 'Click". If the time interval between the touch and the lift is larger than a pre-set times, the set of events is interpreted as a "Long Click and a "Very Long Click". The software identifies the touch area (button) and executes the command or action associated with the button and the type of click.

The use of conventional touch screens does not solve the problem of the cashier losing eye contact with the patron, and the resultant interference with the up-selling process. Additionally, prior art systems suffer from all these many drawbacks, mentioned hereinabove, and above all, from the inability to effectively enhance the promotion and enlargement of sale-orders. There is thus a widely recognized need for, and it would be highly advantageous to have, a system for, and a method of, sales enhancement for serving retail businesses in general, and restaurants in particular, in their efforts to increase revenues at the point of sale.

SUMMARY OF THE INVENTION

According to the teaching of the present invention there is provided a sales enhancement system for retail businesses including: (a) an input mechanism for inputting, into the system, selection information on a plurality of items selected by a patron, the information on each item including: (i) at least one item type, each item type belonging to an associated item category among a plurality of item categories, and (ii) a number of units associated with each item type; (b) a memory for storing the selection information; (c) a display having a plurality of display elements arranged in a matrix, wherein each element of the display elements represents a single unit of these units, the display designed and configured such that: (i) each item type is positioned within a single column of a plurality of columns in the matrix, each column corresponding to one of the item categories, and (ii) filled and empty elements of the display elements are visually differentiated.

According to another aspect of the present invention there is provided a sales enhancement method for retail businesses, the method including the steps of: (a) providing a system including: (i) an input mechanism for inputting, into the system, selection information on a plurality of items selected by a patron, the information on each item including: (A) at least one item type, each item type belonging to an associated item category among a plurality of item categories, and (B), a number of units associated with each item type; (ii) a memory for storing the selection information; (iii) a display having a plurality of display elements arranged in a matrix, wherein each element of the display elements represents a single unit of these units; (b) inputting the item selection data into the system; (c) displaying the item selection data within the matrix such that: (i) each item type is positioned within a single column of a plurality of columns in the matrix, each column corresponding to one of the item categories, and (ii) filled and empty elements of the display elements are visually differentiated.

According to yet another aspect of the present invention there is provided a sales enhancement method for retail businesses, the method including the steps of: (a) providing a system including: (i) an input mechanism for inputting, into the system, selection information on a plurality of items selected by a patron; (ii) a memory for storing: (A) the selection information; and (B), available item types; (iii) a data processor; and (iv) a display; (b) inputting, into the system, the selection information; (c) storing the selection information; (d) identifying, by means of the processor, the selection information as at least one linguistic term, the term selected from the group consisting of nouns, adjectives, verbs, proper nouns and adverbs, the term belonging to a predetermined list; (e) combining at least one linguistic term into at least one phrase, each phrase representing an item potentially selected by the patron, the item corresponding to one of the available item types, and (f) displaying, on the display, each item.

According to still another aspect of the present invention there is provided a sales enhancement method for retail businesses, the method including the steps of: (a) providing a system including: (i) a touch screen for inputting, into the system, sale selection information on a plurality of items selected by a patron; (ii) a memory for storing: (A), the selection information; and (B), available item types; and (iii) a data processor; (b) inputting the selection information, into the system, by writing the sale selection information on the screen; (c) storing the selection information; (d) identifying, by means of the processor, the selection information as at least one item selected by a patron, the item corresponding to at least one of the available item; types, and (e) displaying at least one item on the touch screen.

According to still another aspect of the present invention there is provided a sales enhancement method for retail businesses, the method including the steps of: (a) providing a system including: (i) an input mechanism for inputting, into the system, information on a plurality of selected items selected by a patron; (ii) a memory for storing: (A) the information, and (B) a data-base; (iii) a data processor, and (iv) a display; the data processor providing on-line communication with the data-base; (b) inputting the information into the system; (c) storing the information; (d) retrieving from the data-base, via the processor, sale attributes and/or sale items and sale quantities stored within the data-base, in response to each item of the selected items, and (e) displaying at least one suggested sale item on the display.

According to one feature in the described preferred embodiments, the sales enhancement system further includes: (d) a processing unit for determining a number of patrons according to a number of the filled elements in a main item column.

According to another feature in the described preferred embodiments, the sales enhancement system further includes: (d) a processing unit for determining a number of patrons according to a maximal number of the filled elements in any column.

According to yet another feature in the described preferred embodiments, each item type is represented by a distinctive item type icon, and each of the filled elements includes an item type icon.

According to still another feature in the described preferred embodiments, each of the unfilled elements includes data representing credit point opportunities.

According to still another feature of the present invention, the display further includes a column displaying data representing earned credit points.

According to yet another feature of the present invention, the sales enhancement system further includes: (e) an audio signal generator, controlled by the processing unit, for generating a first audio signal for each input of the data into the system.

According to yet another feature of the present invention, described in the preferred embodiments, the audio signal generator is further controlled by the processing unit to generate a second audio signal when the input completes a family set of items.

According to yet another feature described in the preferred embodiments, one of the item categories is a main item, the main item belonging to a main item column, the method further including the step of: (d) determining a number of patrons according to a number of the filled elements in the main item column.

According to still another feature of the present invention, described in the preferred embodiments, the sales enhancement method further includes the step of: (e) determining additional sale opportunities according to the number of the filled elements in the main item column.

According to yet another feature of the present invention, the sales enhancement method further includes the step of: (d) determining a number of patrons, n, according to a maximal number of the filled elements in any column.

According to still another feature of the present invention, described in the preferred embodiments, the sales enhancement method further includes the steps of: (e) providing a pre-determined number (C) of the item categories within C columns, and (f) determining additional sale opportunities based on a difference between n and a number of the filled elements in at least C−1 of the columns.

According to yet another feature described in the preferred embodiments, the method further includes the step of: (d) filling the display elements starting from a pre-determined row.

According to yet another feature of the present invention, described in the preferred embodiments, each of the unfilled elements includes data representing credit point opportunities.

According to still another feature of the present invention, the sales enhancement method further includes the step of: (e) displaying additional sale opportunities on the display.

According to yet another feature of the present invention, described in the preferred embodiments, the method further includes the step of: (f) indicating a reward for fulfilling at least one of the additional sale opportunities.

According to yet another feature of the present invention, described in the preferred embodiments, the combining includes comparing each phrase with a list of predetermined phrases to produce a comparison result.

According to still another feature of the present invention, if the comparison result is complete agreement between the phrase and one of the predetermined phrases, then the phrase represents one of the items.

According to yet another feature described in the preferred embodiments, if the comparison result is that terms are missing to complete a phrase that represents one of the items, then the method further includes, prior to step (f), the steps of: (g) selecting a partial list from the list, the partial list including some of the predetermined phrases representing the items potentially selected by the patron; (h) displaying the potentially selected items, and (i) selecting at least one of the predetermined phrases representing the items.

According to yet another feature of the present invention, described in the preferred embodiments, if the comparison result is that none of the predetermined phrases include terms of the phrase, then the method further includes: (g) displaying a message that no such item is available.

According to still another feature described in the preferred embodiments, the combining of at least one linguistic term is achieved using a direction attribute.

According to yet another feature of the present invention, described in the preferred embodiments, the inputting is performed while maintaining eye contact with the patron.

According to yet another feature of the present invention, described in the preferred embodiments, at least one suggested sale item is selected from the sale attributes.

According to still another feature of the present invention, at least one suggested sale item is selected from the sale items.

According to yet another feature of the present invention, described in the preferred embodiments, at least one suggested sale item is selected from statistical data.

According to still another feature of the present invention, described in the preferred embodiments, the sale attributes and the sale items are based on statistical data from a particular store branch.

According to yet another feature of the present invention, the sale attributes and the sale items are based on statistical data from a plurality of store branches.

According to yet another feature described in the preferred embodiments, at least one suggested sale item consists of a predetermined number (N) of the suggested sale items.

According to still another feature of the present invention, described in the preferred embodiments, the selection of the sale attributes is selected from a group of sale attributes consisting of time of day, type of day, type of patron, and type of sale.

According to still another feature of the present invention, described in the preferred embodiments, the items are food products.

According to yet another feature of the present invention, at least one suggested sale item includes a promotional item.

According to yet another feature of the present invention, described in the preferred embodiments, the method further includes: (f) representing the predetermined number (N) of suggested sale items as easy to reach, predetermined touch-buttons on the screen.

The present invention successfully addresses the shortcoming of the existing technologies by providing a system for, and a method of sales enhancement for serving retail businesses in general, and restaurants in particular to increase revenues at the point of sale. The system, and method, are simple and easy to learn and to operate.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is a logical flow diagram of the Phrase look-up process.

DESCRIPTION OF THE PREFERRED EMBODIMENTS

Figure 1:
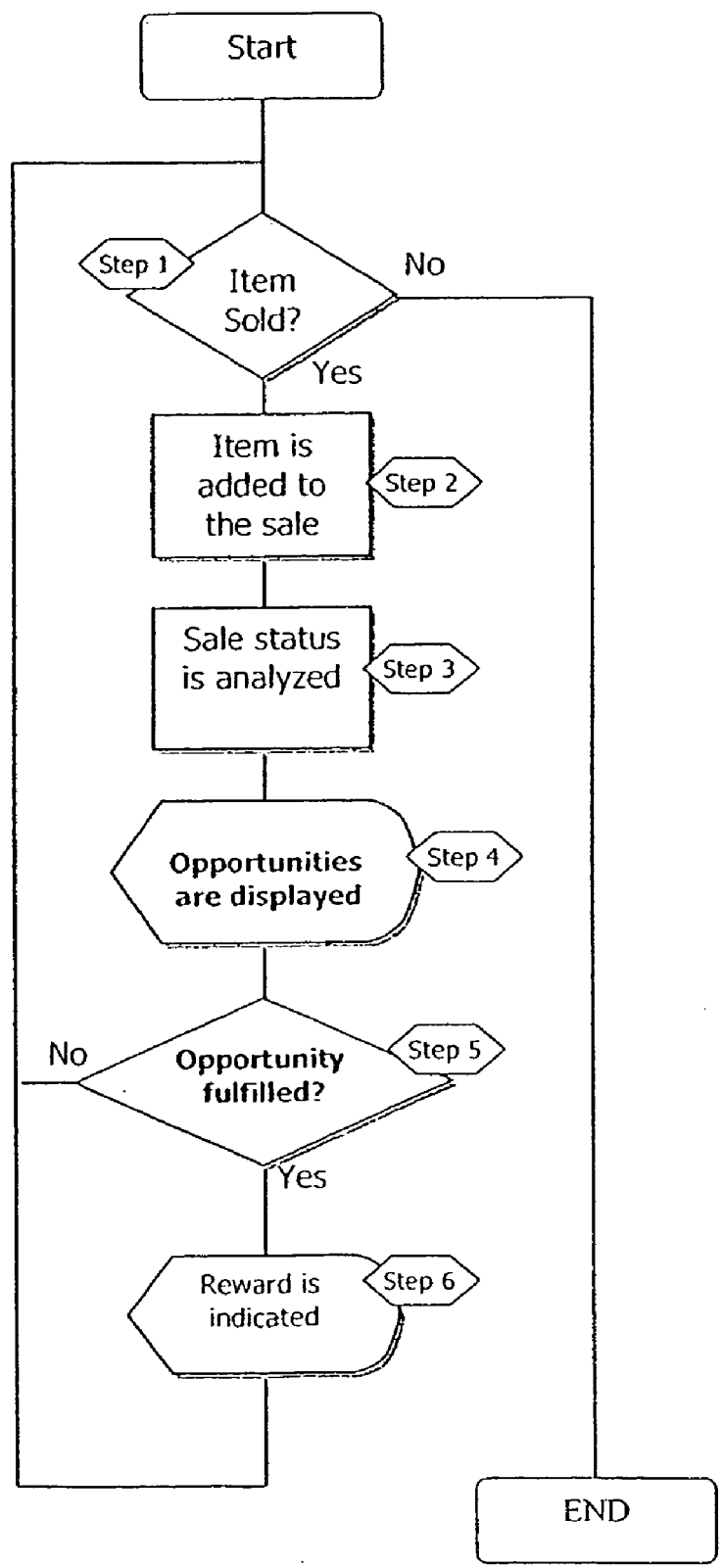
FIG. 1 is a logical flow diagram of the sale enhancement process of the present invention.

The present invention is a system for, and a method of sale enhancement for retail businesses, and in particular for sales enhancement of products such as fast foods, which are of different types, yet are related to each other, so as to form a family set.

The principles and operation of the system and method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Although the present invention applies to various retail businesses and environments, and although many alternatives, modifications, variations and combinations will be apparent to those skilled in the art, for the sake of convenience, most of the description provided herein centers around the fast food, quick service, restaurant industry.

The tools cashiers use in the prior art, i.e., Sale Terminals, are mainly designed for order and payment registration, but not for sales enhancement. The Sales Enhancement System of the present invention retains the functionality of prior art POS terminals or cash registers, while delivering an additional layer of sales enhancement features. The inventive system revises the design of prior art cash registers, which is generally towards speed and accuracy, but not sales promotion. This may be attributed to the fact that cash registers are mostly used at a relatively late phase of the purchasing cycle, after the decision to buy has been made. This is the situation in supermarkets, where buying decisions are made at the isles, and at table service restaurants where the waiter takes orders at the table and then goes to the cash registers to enter the orders, often at the end of the meal.

According to the present invention, new sales promotion oriented tools can be designed and embedded in a cash register, thereby converting the cash register into a sales enhancement machine.

For example: most cash registers include a set of buttons or keys that are used to perform the various cashier functions. The buttons vary in size according to their "importance" to the process: more important and more frequently used functions will be assigned to larger keys. Typically, the larger keys will be "CASH", "TOTAL", etc. In sales enhancement systems, the "important" functions are the selling functions and the "Cola" button should be larger than the "Cash" button.

In a preferred embodiment of the present invention, the Sale Terminal of the cashier is, in fact, a computer equipped with a touch-screen, which is a screen equipped with a special sensor that can sense a touch and the exact location thereof on the screen.

The software can define areas on the screen ("Buttons") that, when touched, perform a special function in the computer or initiate a series of software instructions that perform a certain function. The computer software tracks the screen at all times and senses when the screen is touched, the exact position of the touch, and when the touching object (finger, pen, pencil, etc.) is lifted. The software also measures time intervals between such "touches" or "movements" and "lifts". The touch screen can be the only input device the computer has, or alternatively, the touch screen can work simultaneously with a regular keyboard or mouse.

Referring now to the drawings, FIG. 1 is a logical flow diagram of the sale enhancement process of the present invention. In step 1, a list of the already sold items is displayed on a display screen. When an additional item is sold, the item is added to the list of sales in step 2. The list of sales is checked in analyzing step 3 and the software—a simple algorithm—detects the related items that can be sold in addition to the items already sold. The trick is not in the algorithm or the analyzing step 3, but in the way the results are displayed to the cashier. The algorithm counts the number of main courses (e.g., a hamburger in a hamburger restaurant) and compares this number to the number of beverages or side dishes (e.g., French fries). If the number of main courses is larger, there is an opportunity to sell at least one additional beverage and/or side dish.

The opportunities are displayed in step 4 on the display screen, and the cashier is prompted to follow them. In Step 5, the success of the cashier in upselling an item is examined: in the event that the cashier is successful in upselling an additional item, there is a reward associated with this event, which is displayed, in step 6, as points, or as a money value, associated with the displayed opportunity of step 4. Subsequently, the system returns to step 1.

In the event that the cashier is not successful in upselling an additional item, the cashier prompts the patron to purchase any additional items designated as opportunities in step 4. When no opportunities are displayed in step 4, or when the patron has declined all suggested opportunities, the sale is completed.

The decision to up-sell (suggest additional items) is up to the cashier, whose operation is highly motivation-dependent, such that the display of opportunities (step 4) and perhaps more significantly, the display of reward, greatly enhance the focus and motivation of the cashier.

Other features of the instant invention include improving the attention of the cashier to the displayed opportunities of step 4 and boosting willingness to make the up-selling effort by making the selection and selling of these opportunities especially easy to carry out.

It is important to note that the sale of one or more particular items is often preferred, relative to other items, by restaurant management. For example, restaurant management may prefer that the patron buy fish rather than beef. Such a preference is due to higher profitability or to the preferred item being a part of a sales campaign. The cashier should be made fully aware of such preferences if he is to act in the best interests of the restaurant. This preference can be emphasized in the display of opportunities (step 4) and the potential bonus for up-selling such an item can also be displayed.

After managing to sell an additional item (step 5), the cashier is rewarded, and the system issues an appropriate message or indication in step 6.

The innovations of the present invention are associated with the way the process is implemented. The inventions relate to various aspects of data input and output, which are the key to enhancing the ability of cashiers to conduct an effective sales promotion in various retail business environments, and in fast food restaurants, in particular.

In order to succeed in a selling job, a cashier must be able to:

1. Always remember what the patron has already ordered and what he has not ordered;
2. Maintain a high degree of motivation during the sale process;
3. Quickly identify what can and cannot be sold to the patron;
4. Spend a minimal time entering the order on the Sale Terminal;
5. Maintain good eye contact with the patron;
6. Quickly and effectively (and preferably alacritously) answer any question that arises during the sale, such that the patron is provided with all necessary information regarding the various items; and
7. Quickly address problems that surface during service, e.g., fielding strange requests, etc.

In order to enable the cashier to be oriented and always fully aware of the progress of the sale, the inventive system utilizes a Multi-Dimensional Display methodology. The items in a fast food restaurant, by way of example, are classified by type (e.g., appetizers, entrees, beverages, and desserts), by item (e.g., as various types of entrees), and by size (large, regular and small portions).

The food in fast food restaurants typically includes four or more types of food, namely:

1. Main Courses, such as hamburgers or chicken ("Main");

2. Side Orders, such as French fries, onion rings and salads ("Side");
3. Beverages ("Beverage"); and
4. Desserts ("Dessert").

A typical sale includes some of the above, and it is in the interest of the restaurant to encourage patrons to buy a full meal including Main, Side, Beverage and Dessert items, and to buy the largest portion available.

A sale can be associated with more than one person. When two or more persons share the sale, the patron can order in a random order. Sometimes he first orders the main items for all, then the side items and so forth; sometimes, he orders a set of items for each person; and sometimes the items are ordered in a random sequence.

As previously mentioned before, it is extremely difficult for the cashier to remember the items sold after they have been entered into the Sales Terminal, but the Full picture is very important in selling additional items.

Contrary to the prior art, the Multi Dimensional Display uses a matrix of four to five and more columns (depending on the application), and displays the sale in rows and columns. The system works in both vertical and horizontal orientation and the differentiation between rows and columns is solely for ease of explanation.

Figure 2:
FIG. 2(*a* to *i*) represents the Multi-Dimensional Display of the Sale Terminal of a typical fast food restaurant at different stages of the sale, and some of the display alternatives.
Figure 2:
Figure 2:

FIG. 2(a-i) represents the Multi-Dimensional Display of the Sale Terminal of a typical fast food restaurant at different stages of the sale, and some of the display alternatives. Each column in the Multi-Dimensional Display 200 represents a type of dish:

The first column M stands for Main Courses;
The second column S stands for Side Orders;
The third column B stands for Beverages; and
The fourth column D stands for Desserts.

An optional fifth column, points, containing information about incentives, will be discussed herein below.

The rows in this Multi Dimensional Display 200 matrix represent meals, or combinations of meals.

FIG. 2a shows the Multi-Dimensional Display 200 before a sale has commenced. When an item is ordered (step 1 in FIG. 1), a cell in the column that represents the item type is marked by placing an icon in the cell, as shown in FIG. 2b, by a letter, by text or by filling the cell with color. When a second item of the same type is ordered, it is placed in the cell above (or below) the previous item (FIG. 2c).

Some items are actually combinations of items or combination meals. When such an item is sold (step 1 in FIG. 1), all the columns that are associated with the discrete items in the combination are updated. For example, the bottom row of FIG. 2f illustrates the sale of a hamburger combination meal including a hamburger, French fries, and a regular cola. An identical display can represent an order in which these items were ordered individually by the patron.

Most items represent, or are intended to, the consumption of one Patron. However, some items are intended for more than one Patron, e.g., Large Pizza or other family size menu items. The item representation thereof, can have a height (in Rows or columns) of more than one cell.

Some items such as combination items, represent more than one product. For example, coffee and cake may be sold as a combination but they are, in fact, two products: One beverage and one desert. The item representation thereof, can have a width (in Rows or columns) of more than one cell.

Optionally, the marking of the cell is performed by animating an icon and moving the icon to the assigned cell from anywhere on the screen, particularly from the last touched button area, from the top, or from the side of the matrix.

Thus, four columns of icons, colored cells or other signs, represent the sale, and the height of each column represents the number of items purchased of this type. In FIG. 2f, as an example, the sale includes 3 hamburgers, 1 portion of French fries and 2 regular Colas. In most cases, the highest column represents the number of patrons that is associated with the sale. It should be noted that in some cases, patrons might buy French fries and salad, both of which are side orders. When this occurs, the matrix is preferably marked in a special way, e.g., with a line or by filling the appropriate cells with a special color or sign, so that the number of patrons, and hence, the number of displayed opportunities, remains correct.

The gaps of empty cells, between the shorter columns and the highest column, which mark the number of patrons, represent the sale opportunities (step 4 in FIG. 1). Each one of these empty cells represents a patron that has ordered, for instance, a main item and has not ordered a beverage or a side dish. FIG. 2e, for example, represents a sale for three patrons. Row $r_1$, represents the sale-order for the first patron including hamburger, French fries and regular cola; row $r_2$ is the sale-order for the second patron includes only hamburger and regular cola and for the third patron only hamburger as shown in row $r_3$. No dessert is ordered in this sale. Therefore, column M shows 3 Main courses, column S shows 1 Side course, column B shows 2 Beverages and column D is empty. The empty cells of the matrix: $(r_2,S)$, $(r_3,S)$, $(r_3,B)$, $(r_1,D)$, $(r_2,D)$ and $(r_3,D)$, represent the opportunities for additional sales. The empty cells can be filled with item icons that suggest icons of ordered items but are slightly different (e.g., dimmed).

The empty cells can be used to display points or other incentives that will be granted automatically once the cashier has succeeded in "filling" the cell. Special pop-up messages may (as in FIG. 2h) appear to make the cashier aware of special opportunities (step 4 in FIG. 1).

The display is cleared after each sale, day or shift. If the number of rows is insufficient, a scroll-bar, up and down arrows, or the like enable scrolling of the matrix. If needed, the height of the rows is shortened as the sale progresses to allow the display of more rows.

When Multi-Dimensional Display 200 methodology is used on a touch screen, the cells can be used as buttons to invoke various commands relating to the item represented by the cell, such as "View Item Information", "Order an Extra Item", and "Enlarge Portion".

When using the Multi-Dimensional Display 200 methodology, special care should be taken to provide messages and experiences that will increase the motivation level of the cashier. Motivation is achieved by measures affecting the cognitive and emotional layers of the cashier. These cognitive layers are affected by offering the cashier an incentive for success, such as points associated with and granted for each success. The number of points achieved for each success and the accumulated number of points are clearly displayed on the screen in the column labeled points (see FIG. 2g-2i).

Every item is assigned with a pre-programmed number of points, and this number is manipulated according to the number of items in the specific row. In FIG. 2g-2i, for instance, 10 points were assigned for a hamburger sale, 30 points for a sale of French fries and 20 points for a sale of regular cola. The final number of points can be calculated according to various methods and using various arithmetic algorithms. The points are conveniently displayed in the empty cells that represent sales opportunities. If $P_i$ represents the points assigned for a certain item i, $\Sigma P_i$ represents the sum of points assigned to all i items, and N represents the quantity of these items, then, if two 10 point items have been sold, and the system uses, for example, a $(\Sigma P_i{}^*N)$ algorithm as the calculation method, N being equal to 2, then the row is "worth" 40 points $[(10+10)^*2]$.

Optionally, the points are displayed in special callout pop-up windows, to attract attention. An additional option is to display the points in the extra column labeled "points" illustrated in FIG. 2i.

The motivation of the cashier is further enhanced by utilizing the psychological need of a person to complete a broken or unfinished pattern to obtain simpler whole patterns or structures (a Gestalt-related phenomenon). Although the discussion of this principle is beyond the scope of this application, the principle has been broadly studied and is manifest in numerous practical applications including games, gambling, and the like.

The Multi-Dimensional Display 200 methodology creates new, broken patterns each time an item is ordered. Adding items to the order fills these patterns while creating new ones. The broken patterns are enhanced by adding color or line patterns to the matrix. The behavioral need of the cashier to fill and complete the broken patterns creates a constant, minor stress that leads the cashier to act in order to complete the patterns. The only way to complete the missing parts of the pattern is to get the patron to order the items that will fill the empty cells.

The Sale Terminal is preferably designed to produce sounds to assist the cashier, to provide the cashier a confirmation that the last entry was valid, and to warn the cashier of an erroneous entry. Sound can be associated with various events to enhance messages such as "well done", whenever a cashier has completed some significant achievement (a complete row or a sale having an especially high number of points).

Optionally, the system determines the priority of items by associating each item with a priority attribute, such as the length of the sound from the Sale Terminal, response, pitch-tone structure thereof, predetermined according to the value of the priority attribute. Other possible attributes that dictate the type of sound are, for example, the importance of selling that item, to the store or restaurant keeper, or to the price of the item.

Sound has been known to induce powerful emotional responses in people, thus the conditioning effect of sound associated with the points and other incentives has a strong effect on the motivation and performance of the cashier.

Optionally, the Multi-Dimensional Display 200 methodology is used on a second screen facing the patron. The second screen has a similar motivational and orienting effect on the patron. The psychological need of the patron to complete a row or a pattern can thus be utilized to promote additional, "complementary" sales. Points or incentives may be granted to the patron in a customer loyalty program to prompt the patron to purchase additional items.

An additional feature of the present invention is termed Natural Language Input (NLI). Restaurant and fast food environments are frequented by patrons some of whom are characteristically indecisive and change their mind frequently. Consequently, cashiers face a conflict. Correcting mistakes and changing previous orders is tedious and in many cases futile, as the decisions of the patron is not final. Cashiers often wait, memorizing the order until it is apparent that the patron has reached a final decision. While this wait eliminates many errors in re-entering items, it is slow and depends on the memory of the cashiers, such that numerous entry errors transpire.

NLI overcomes this problem by treating the data entry as "Terms", rather then "items" and "commands". The Terms are intercepted by the NLI engine, which then forms them into "Phrases" that are parsed into meaningful commands. NLI is preferably programmed to process all the basic Terms that are used by a patron to describe an order, and has the ability to combine these Terms into meaningful instructions or into names of items that are sold, returned or voided from the list. NLI also has the capacity to combine partial Phrases and use those to predict the final meaning of the full Phrase or a list of possible meanings that will be presented to the cashier.

The NLI engine handles the input of Terms, processes the Terms to construct Phrases that represent "Entities" such as items, actions and commands, and feeds these Phrases for further handling and processing.

The Terms used by the NLI engine are divided into the regular grammatical Classes: nouns, adjectives, verbs, proper nouns, adverbs, etc. Each of these Classes, also termed in this application as a Parent of a Term, is further divided into Sub-Classes. Thus, the Terms form a hierarchical structure of Classes, Sub-Classes and Expressions.

Adjectives, for example, can be divided to Sub-Classes such as Size, Color, and Flavor, and each Sub-Class will include a set of Expressions, e.g., size: large, small, double, etc.

Each Sub-Class may include a Default Expression. This Expression (typically "Regular") is usually omitted from the Phrase and is normally used to delete another Expression from the same Sub-Class from the Phrase.

The Phrase is a unique collection of Terms, which will appear hereafter as words enclosed in brackets and separated by commas, e.g., [large, diet, cola] or [cola]. Each Phrase includes a set of one or more Terms and represents a system Entity: an item, an action, etc. The relation between the Phrases and the Entities is one to one, such that each Phrase is associated with a single Entity and each Entity is associated with a single Phrase. Hence, the Phrase [large (size adj.), diet (nutrition adj.), cola (noun)] represents a large glass of diet cola and Large Diet Cola represents a Phrase of [large, diet, cola].

Each Phrase includes a single Noun and/or Verb but can contain an unlimited number of Adjectives and Adverbs.

Each System Class, Adjective, Adverb, Class and Sub-Class that contain Adjectives and Adverbs, and the expressions thereof, has a Direction Attribute (Backward, Forward or Default), according to the language of the system, which determines behavior of the Direction Attribute, namely, to the previous Noun or Verb or to a new, expected one.

In English, an adjective precedes the noun that it modifies (a large steak), so "Large" has an attribute of Forward. In some languages, like Hebrew and Arabic, the adjective follows the noun and has a Backward Attribute.

The Direction Attribute is usually associated with the common language spoken in the region where the system is used, and NLI will usually follow the natural order of words of this common language.

When an Adverb or an Adjective is input into the NLI engine, the NLI engine looks at the direction attribute for this Adverb or Adjective. If the direction attribute is Default, the NLI engine takes the attribute of the parent of the Term. If the direction attribute of the Parent of the Term is Default, the NLI engine takes the attribute of the Parent of this Term and so forth until no Parent is found (the system Class). If the attribute of the system Class is default, then the attribute is set to Forward.

Once the NLI has determined the direction attribute, the NLI attempts to use the Term to construct a Phrase. If the attribute is Backward, NLI attempts to add the Term to the current processed Phrase. If the attribute is Forward, NLI constructs a new Phrase and adds the Tern to the new Phrase.

Phrases are created in sequence, one after another. A Phrase is complete when the Phrase is identified with an Entity. If a Term is added to a previously completed Phrase, the Term is re-associated with a new Entity. The Term "Diet", for example, is added to [Large, Cola] to create [Large, Diet, Cola].

In each Phrase, there is only one word of the same Sub-Class. When a Term is added to a Phrase, the Phrase is searched for additional Terms belonging to the same Sub-Class as the added Term. If such an item is found then the item is either replaced by the new, added Term or rejected.

The default Expression of a Sub-Class has no significance in a Phrase and is usually omitted. When a default Expression is added to a Phrase, an Expression of the same Sub-Class is first searched and omitted if found. In practice, the default Expression is only used to cancel or omit a previous entry. For example, Regular is the Default Expression of the Adjective Sub-Class "Size" that includes Large, Small and Regular. The Phrase [Regular, Cola] is identical to [Cola], therefore "Regular" is omitted. The decision to omit, or not to omit, the default expression in a phrase, must be kept through the whole system.

Entities are objects that represent activities, items, reports, etc. Each Entity is associated with a Phrase, therefore, "Cash Payment" is an Entity that is associated with the Phrase [Pay (Verb), Cash (Noun)].

Referring to the Phrase look-up process (FIG. 4), each time a Term is added to a Phrase, the Phrase is looked up in Phrase Table 401. The search returns a Result Set 402, namely a list of Phrases, and a Result Code that can be one of the following:

Exact Phrase 403: The Result Set comprises a single Phrase that is identical to the looked-up Phrase. In this case, the Entity associated with the Phrase is activated 404 (the item, activity, etc., is identified).

Single Near Phrase 405: The Result Set comprises a single Phrase that is the only Phrase in Phrase Table 401 that contains all the Terms in the Looked-Up Phrase, but is not identical. In this case, the Entity associated with the found Phrase is either ignored 406 or displayed 401, and the cashier is prompted to confirm or ignore it. The cashier, in turn, can confirm or reject the entity 408. If entity 408 is confirmed, the Phrase is activated 409.

Plural Near Phrases 410: The Result Set includes a list of more than one Phrase that contains all the Terms in the looked-up Phrase, but none of these Phrases is identical to the looked-up Phrase. In this case, the list can be ignored 411 or it can be displayed to the cashier 412, who is prompted to select and confirm one of the Entities or to reject the whole list. If the cashier selects one of the Entities and confirms the selected Entity 413, the Phrase is activated 414.

No Phrases Found (Error) 415: The Result Set is empty. The looked-up Phrase is an erroneous one, namely, it does not exist as a Phrase or a part of a Phrase in the Phrases table. In this case, an error message is usually displayed 416.

Terms that change the behavior of other Terms are "Operators". Direction Operators change or override the Direction Attributes. Backward and Forward Operators set the Direction Attribute of the following Term to Backward and Forward values, overriding any other Direction Attribute.

The NLI system uses NLI in order to facilitate easy, friendly and, above all, flexible entry of data.

In a preferred embodiment of the present invention, the Terms that form the NLI structure are represented as buttons on the Sale Terminal screen or keyboard. The cashier marks a Term by pressing a key, or touching a designated area on the touch screen, that is associated with the Term. The software tests the Term and decides if the Term should be applied to the currently processed Phrase or applied to a new Phrase. The Term is then applied to the selected Phrase. Another embodiment can use voice recognition technology.

Whenever a Term is applied to a Phrase, the Phrase is looked-up in the Phrase table and an Entity or a set of possible Phrases (Result Set) is returned. If the Phrase represents an Entity, this Entity is applied to the current sale, or a new sale is initiated. If a Phrase is the only one possible, but is incomplete, the Phrase is displayed and 'suggested' to the cashier, who will confirm it with a keystroke or a touch of a pre-defined button. If the Near Result Set includes more than one entry, the list can be displayed and the correct Entity is selected and confirmed by the cashier.

As an example: the customer says: "Give me a cola, make it a large one, also extra large fries and a burger and make it double, with cheese, on second thought, make it regular". Table 1 shows how the cashier enters this sentence as a series of Terms (marked in bold face) and how NLI processes these Terms for the Sale Order.

TABLE 1

An Example of A Sentence Entered as A Series of Terms and The Effect, Thereof, on the Sale-Order

| Term | Type | Effect on Phrase | Resulting Phrase | Effect on order |
|---|---|---|---|---|
| Cola | Noun | New Phrase, "Cola" | [Cola] | Regular Cola added |
| Make It | Backward Direction Operator | The following Term will be applied to the previous Phrase | N/A | None |
| Large | Adjective, Sub-Class Size | Large is added to the currently processed Phrase. Normally, it would be a forward adjective and would start a new Phrase. | [Cola, Large] | Large Cola replaces Regular Cola |
| Extra Large | Adjective, Sub-Class Size | A new Phrase is created | [Extra Large] | None |
| Fries | Noun | Fries is applied to the current Phrase | [Extra Large, Fries] | Extra Large Fries added |
| Burger | Noun | Cannot be applied to the current Phrase that already includes a noun. A new Phrase is created | [Burger] | Burger added |
| Make It | | The following Term will be applied to the previous Phrase | N/A | None |
| Double | Adjective, Sub-Class Size | Double is added to the current Phrase. | [Hamburger, Double] | Double Burger replaces Regular Burger |
| With Cheese | Adjective, Sub-Class Condiment | An adjective with a backward attribute Applied to the current Phrase | [Burger, Double, With Cheese] | Double Burger with Cheese replaces Double Burger |

TABLE 1-continued

An Example of A Sentence Entered as A Series of Terms and The Effect, Thereof, on the Sale-Order

| Term | Type | Effect on Phrase | Resulting Phrase | Effect on order |
|---|---|---|---|---|
| Make It | Backward Direction Operator | The following Term will be applied to the previous Phrase | N/A | None |
| Regular | Adjective, Sub-Class Size | Will replace the 'Double' Term in the Phrase and be omitted. | [Burger, With Cheese] | Regular Burger with Cheese replaces Double Burger |

Table 2 shows a partial list of menu items of a typical fast food restaurant, and Table 3 demonstrates what happens when several Phrases are looked-up by the system.

TABLE 2

Menu Items of A Typical Fast Food Restaurant

| Item | Phrase |
|---|---|
| Regular Cola | [Cola] |
| Large Cola | [Large, Cola] |
| Small Cola | [Small, Cola] |
| Cola Can | [Can, Cola] |
| Regular Diet Cola | [Diet, Cola] |
| Large Diet Cola | [Large, Diet, Cola] |
| Small Diet Cola | [Small, Diet, Cola] |
| Sprite | [Sprite] |
| Large Sprite | [Large, sprite] |
| Diet Sprite Can | [Diet, Sprite, Can] |

TABLE 3

The System Display When Several Phrases Are Looked-Up

| Phrase | Look Up Result | Remarks |
|---|---|---|
| [Large] | List: Large Cola, Large Diet Cola, Large Sprite | The list can be displayed for selection |
| [Large, Cola] | Large Cola Large Diet Cola | The default is large cola (identical) |
| [Large, Diet] | Large Diet Cola | Only one, uncompleted possible. The system displays it and expects confirmation. |

The touch screen, described hereinabove, is extensively used for POS terminals in various industries, especially in table service and fast food restaurants. As already mentioned above, the use of prior art touch screens forces the cashier to look at the screen while operating, thus causing the cashier to lose eye contact with the patron, and interfere with the up-selling process. In order to enable the cashier to decrease the screen viewing, the present invention uses the following method. If the various points between a 'touch' and a 'lift' spread over a larger area of the screen (i.e., the distance between the points exceeds a pre-set length), the set of points is perceived and interpreted as a "Gesture". The set of points is analyzed and compared to a table of patterns using known, prior art, pattern recognition algorithms. The Gesture is interpreted without considering the absolute location and the relative size of the Gesture on the screen, but only from the relative position of the points.

If the set of points resemble such a pattern, a command or an action associated with this pattern is executed. The patterns are characters, digits and symbols, and are performed in any area of the screen.

The above-mentioned Gestures recognition technique can enable the operation of a touch screen without requiring the cashier to look at the screen. This enables the cashier to maintain eye contact with the patron instead of lowering his or her eyes, which is known to deleteriously effect the up-selling process. The Gestures recognition technique also eliminates or reduces searching for buttons by the cashier.

The gestures can also be associated with terms and operate in direct connection to the NLI system.

Figure 3:
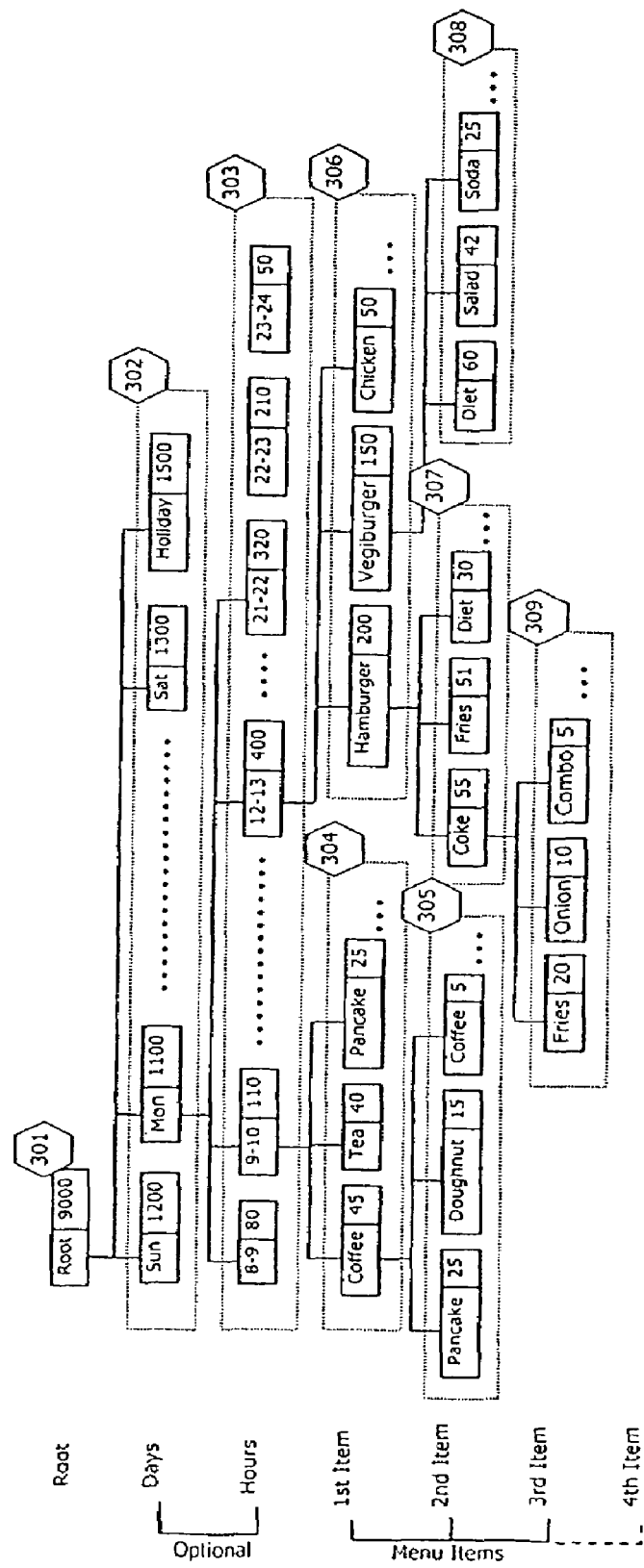
FIG. 3 is a logical flow diagram of the after-sale analyzing device.

Referring now to FIG. 3, another feature of the present invention is an after-sale analyzing device. The heart of the after-sale analyzing system is a sophisticated tree structure, which is described herein below.

Each node in the tree-like structure includes two data fields. The first data field 301 is an entity. An entity is almost any regular activity performed by the cashier during the normal execution of the sale process. Most of these entities are associated with the sale of menu items, as shown in FIG. 3, but payment, discount, etc. can also be regarded as entities.

Other entities, which are also part of the tree, are abstract entities that are part of the sale attributes, which do not require any action from the cashier. These entities, termed "sale attributes", are linked to the hour the sale was made 303, or to any selected distribution, such as the type of day—day of the week, Holiday, etc., 302, or to the type of customer—female, male, child, loyalty club member, etc., to the type of sale—Eat-in, Take-away, or Drive-In, etc. (not shown in FIG. 3). These sale attributes are automatically added to the root node at the beginning of the sale.

Each node in the tree, except root node 301, has a parent node; each node in the tree, except last nodes 308 and 309, has children nodes. Thus, day nodes 302, are the children of root node 301, and root node 301 is the parent of day nodes 302. Children of the same parent node are referred to as "brothers". Therefore, root node 301 is a special node that is part of every sale, but has no parents and no brothers.

Each node, except abstract nodes, can be activated in the course of the sale. Thus, a menu item is sold or ordered, a cash payment is paid, etc. The abstract nodes cannot be 'activated' and they are added, automatically by the system, to the sale analysis.

Each sale is represented by a successive list of nodes (route), moving from parent to child and so on. For example, a sale of coffee and pancakes on Monday at 9:30 AM can be represented by the following route, or ordered list of nodes:
1. Root Node 301;
2. Day: Sunday, node 302;
3. Hour: 9-10 AM, node 303;
4. $1^{st}$ item: Coffee, node 304; and
5. $2^{nd}$ item: Pancake, node 305.

Each node contains a second, counter field. Each time a node is activated, the counter is increased by one, or by the quantity associated with the activity. Thus, a sale of two hamburgers increases the specific 'hamburger node' by one, or by two, depending upon the particular specific implementation of the system.

Once the counter has been increased, the group of children nodes (i.e., the brothers) belonging to the same parent is sorted in a descending order according to the respective counters, such that the node with the highest counter is placed first, the second highest is placed second, etc. The abstract nodes are not sorted.

Every entity, with the exception of the abstract nodes, can occur in the tree more than one time, depending on the specific sale route or pattern. In FIG. 3, a "Fries" node appears in node 307 as a child of Hamburger node 306, and in node 309 as a child of coke node 307.

The tree structure is used in two modes, which can be simultaneous:
learning mode, and
operation mode.

In learning mode, each sale increases the nodes along the sale route in the manner described above. Each time an entity is activated, the counter is increased and the group of brother nodes is sorted.

In operation mode, whenever an entity is activated, the system looks at the children of that entity. The N topmost entities are chosen, and placed at a predefined set of buttons, so that these N entities are easily activated by the cashier, simply by clicking the buttons.

The logic of the system is better understood through the following example: in every node along the sale root, the N topmost children entities are the ones most frequently used in previous similar situations (in learning mode). Therefore, it is highly probable that in a similar situation, the N topmost children entities will be the most likely candidates for selection. When a patron orders a hamburger 306, case history shows that in 200 instances that occurred on Monday 302, 55 patrons, or 27.5%, proceeded to order Coke 307, 51, or 25%, ordered Fries 307, and 30 (15%) ordered Diet Coke 307. It is highly likely, therefore, that the patron will now order one of these three that constitute 82.5% of the sales. These three entities (Coke, Fries and Diet Coke, are placed on the touch screen in respective buttons.

Similarly, if a patron starts off with a Vegiburger, as 150 others did on Monday at 12:00 to 13:00 306, it is more likely that this patron will go on to order Diet Coke 307, which represents 60 patrons out of the 150, or 40%, etc.

The after-sale analyzing tree is, therefore, used to predict the next N most probable activated entities, and these predicted entities are placed in easy to reach buttons on the screen.

Optionally, in another preferred embodiment, the system attaches a fixed default child entity, or children entities, to every node. When child entities of nodes are sorted, these nodes are automatically placed at the lop of the group, and, thus, they are always easily available to the cashier, disregarding their probability or past occurrences. This is used by a store or restaurant owner to promote special child entities whenever the parent node is activated. Thus, for example, the entity of "enhance this item to a combination meal" is linked to any node representing a menu item, which usually is a base to a meal or a combination meal, and appears as the first choice each time the item is sold or ordered.

Another preferred embodiment, also not shown in FIG. 3, is implemented by removing some entities from the system. Such entities will be ignored by the operation process and will never be displayed as special buttons. Thus, a store or restaurant owner can suppress the sales of these specific entities.

As used herein and in the claims section that follows, the terms "row" and "column" refer in a broad sense to perpendicular directions within a matrix, and not necessarily to horizontal and vertical directions.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A sales enhancement system comprising:
   (a) an input mechanism for inputting, into the system, selection information on a plurality of items selected by at least one patron making an order, said selection information including information on a number of units associated with each of said items;
   (b) a memory for storing said selection information;
   (c) a processor for processing said information so as to classify each one of said items as belonging to an item type of a plurality of item types, and
   (d) a multi-dimensional display, associated with said processor, for displaying said selection information, said display having a plurality of rows and a plurality of columns so as to form a plurality of display elements arranged in a matrix, wherein
      (i) each column of said plurality of columns is adapted to contain a single item type of said item types, and
      (ii) each row of said plurality of rows is adapted to contain particular hems of said items, said particular items belonging to different item types of said item types, such that when said particular items in said rows are displayed in said display elements as filled display elements, at least one additional sales opportunity becomes a visually evident sales opportunity,
and wherein said visually evident sales opportunity becomes visually evident when at least one unfilled display element, of said plurality of display elements, is disposed in a partially-filled row of said rows.

2. The sales enhancement system of claim 1, wherein said visually evident sales opportunity becomes visually evident when a column of said plurality of columns has fewer said filled display elements with respect to another column of said plurality of columns.

3. The sales enhancement system of claim 2, wherein said input mechanism includes a touch screen.

4. The sales enhancement system of claim 2, wherein said particular items are food products.

5. The sales enhancement system of claim 2, wherein said particular items are fast food items.

6. The sales enhancement system of claim 1, wherein said input mechanism includes a touch screen.

7. The sales enhancement system of claim 1, wherein said items are food products.

8. The sales enhancement system of claim 1, wherein each element of said display elements represents a single unit of said units.

9. The sales enhancement system of claim 8, wherein said visually evident sales opportunity becomes visually evident when at least one unfilled display element, of said plurality of display elements, is disposed in a partially-filled row of said rows.

10. The sales enhancement system of claim 8, wherein said visually evident sales opportunity becomes visually evident when a column of said plurality of columns has fewer said filled display elements with respect to another column of said plurality of columns.

11. The sales enhancement system of claim 8, wherein said plurality of items is displayed in said display elements such that fulfilling said additional sales opportunity completes an unfinished pattern of said items in said matrix.

12. The sales enhancement system of claim 1, wherein said plurality of items is displayed in said display elements such that fulfilling said additional sales opportunity completes an unfinished pattern of said items in said matrix.

13. The sales enhancement system of claim 1, wherein said processor is adapted to determine a number of units associated with each of said item types.

14. A sales enhancement system comprising:
   (a) an input mechanism for inputting, into the system, selection information on a plurality of items selected by at least one patron making an order, said selection information including information on a number of units associated with each of said items;
   (b) a memory for storing said selection information;
   (c) a processor for processing said information so as to classify each one of said items as belonging to an item type of a plurality of item types, and
   (d) a multi-dimensional display, associated with said processor, for displaying said selection information, said display having a plurality of rows and a plurality of columns so as to form a plurality of display elements arranged in a matrix, wherein
      (i) each column of said plurality of columns is adapted to contain a single item type of said item types, and
      (ii) each row of said plurality of rows is adapted to contain particular items of said items, said particular items belonging to different item types of said item types,
such that when said particular items in said rows are displayed in said display elements as filled display elements, at least one additional sales opportunity becomes a visually evident sales opportunity,
and wherein said processor is adapted to determine a number of said at least one patron, according to a maximal number of said filled elements in any said column of said columns.

15. The sates enhancement system of claim 14, wherein said items are food products.

16. The sates enhancement system of claim 14, wherein said processor is adapted to determine a number of said at least one patron, according to a number of said filled elements in a particular column, of said columns, containing main items of said plurality of items.

17. The sales enhancement system of claim 16, wherein said items are food products.

18. The sates enhancement system of claim 16, wherein said main items are main food courses.

19. The sales enhancement system of claim 14, wherein said input mechanism includes a touch screen.

20. A sales enhancement system comprising:
   (a) an input mechanism for inputting, into the system, selection information on a plurality of items selected by at least one patron making an order, said selection information including information on a number of units associated with each of said items;
   (b) a memory for storing said selection information;
   (c) a processor for processing said information so as to classify each one of said items as belonging to an item type of a plurality of item types, and
   (d) a multi-dimensional display, associated with said processor, for displaying said selection information, said display having a plurality of rows and a plurality of columns so as to form a plurality of display elements arranged in a matrix, wherein
      (i) each column of said plurality of columns is adapted to contain a single item type of said item types, and
      (ii) each row of said plurality of rows is adapted to contain particular items of said items, said particular items belonging to different item types of said item types,
such that when said particular items in said rows are displayed in said display elements as filled display elements, at least one additional sales opportunity becomes a visually evident sales opportunity,
and wherein each unfilled element of said elements in partially-filled rows and partially-filled columns includes data representing credit point opportunities.

21. The sales enhancement system of claim 20, wherein said input mechanism includes a touch screen.

22. The sales enhancement system of claim 20, wherein said items are food products.

23. A sales enhancement system comprising:
   (a) an input mechanism for inputting, into the system, selection information on a plurality of items selected by at least one patron making an order, said selection information including information on a number of units associated with each of said items;
   (b) a memory for storing said selection information;
   (c) a processor for processing said information so as to classify each one of said items as belonging to an item type of a plurality of item types;
   (d) a multi-dimensional display, associated with said processor, for displaying said selection information, said display having a plurality of rows and a plurality of columns so as to form a plurality of display elements arranged in a matrix, wherein
      (i) each column of said plurality of columns is adapted to contain a single item type of said item types, and
      (ii) each row of said plurality of rows is adapted to contain particular items of said items, said particular items belonging to different item types of said item types,
such that when said particular items in said rows are displayed in said display elements as filled display elements, at least one additional sales opportunity becomes a visually evident sales opportunity, and
   (e) an audio signal generator, controlled by said processor, for generating a first audio signal for each input of said selection information into the system,
wherein said audio signal generator is further controlled by said processor so as to generate a second audio signal when said input completes a family set of said items.

24. The sales enhancement system of claim 23, wherein said input mechanism includes a touch screen.

25. The sales enhancement system of claim 23, wherein said items are food products.

26. The sales enhancement system of claim 23, wherein said processor is adapted to determine a number of said at least one patron, according to a number of said filled elements in a particular column, of said columns, containing main items of said plurality of items.

27. The sales enhancement system of claim 26, wherein said main items are main food courses.

28. A sales enhancement system comprising:
   (a) an input mechanism for inputting, into the system, selection information on a plurality of items selected by at least one patron making an order, said selection information including information on a number of units associated with each of said items;
   (b) a memory for storing said selection information;

(c) a processor for processing said information so as to classify each one of said items as belonging to an item type of a plurality of item types, and (d) a multi-dimensional display, associated with said processor, for displaying said selection information, said display having a plurality of rows and a plurality of columns so as to form a plurality of display elements arranged in a matrix, wherein (i) each column of said plurality of columns is adapted to contain a single item type of said item types, and (ii) each row of said plurality of rows is adapted to contain particular items of said items, said particular items belonging to different item types of said item types, such that when said particular items in said rows are displayed in said display elements as filled display elements, at least one additional sales opportunity becomes a visually evident sales opportunity, and wherein said plurality of items is displayed in said display elements such that fulfilling said additional sales opportunity completes an unfinished pattern of said items in said matrix.

29. The sales enhancement system of claim 28, wherein said input mechanism includes a touch screen.

30. The sales enhancement system of claim 28, wherein said particular items are food products.

31. A sales enhancement method comprising the steps of:
(a) providing a sales enhancement system including:
(i) an input mechanism;
(ii) a memory, associated with said input mechanism;
(iii) a processor associated with said memory;
(iv) a multi-dimensional display, associated with said processor, said display having a plurality of rows and a plurality of columns so as to form a plurality of display elements arranged in a matrix;
(b) inputting, into said system, selection information on a plurality of items selected by at least one patron making an order;
(c) storing said selection information in said memory;
(d) processing said information so as to classify, for each one of said plurality of items, an item type belonging to a plurality of item types;
(e) displaying each item of said plurality of items within said matrix such that:
(i) each column of said plurality of columns contains a single item type of said item types, and
(ii) each row of said plurality of rows contains a plurality of items belonging to different item types of said item types, such that at least one additional sales opportunity becomes a visually evident sales opportunity from a display of said matrix, wherein said item types includes a main item, said main item belonging to a main item column of said columns, and (f) determining a number of patrons according to a number of filled elements, of said display elements, in said main item column.

32. The sales enhancement method of claim 31, the method further comprising the step of:
(g) determining said at least one additional sale opportunity according to said number of said filled elements in said main item column.

33. The sales enhancement method of claim 31, wherein said input mechanism includes a touch screen.

34. The sales enhancement method of claim 31, wherein said items are food products.

35. A sales enhancement method comprising the steps of:
(a) providing a sales enhancement system including:
(i) an input mechanism;
(ii) a memory, associated with said input mechanism;
(iii) a processor associated with said memory;
(iv) a multi-dimensional display, associated with said processor, said display having a plurality of rows and a plurality of columns so as to form a plurality of display elements arranged in a matrix;
(b) inputting, into said system, selection information on a plurality of items selected by at least one patron making an order;
(c) storing said selection information in said memory;
(d) processing said information so as to classify, for each one of said plurality of items, an item type belonging to a plurality of item types;
(e) displaying each item of said plurality of items within said matrix such that:
(i) each column of said plurality of columns contains a single item type of said item types, and
(ii) each row of said plurality of rows contains a plurality of items belonging to different item types of said item types, such that at least one additional sales opportunity becomes a visually evident sales opportunity from a display of said matrix, and (f) determining a number of patrons, n, according to a maximal number of filled elements, of said display elements, in any said column.

36. The sales enhancement method of claim 35, the method further comprising the steps of:
(g) providing a pre-determined number (C) of said item types within C said columns, and
(h) determining additional sale opportunities based on a difference between n and a number of said filled elements in at least C−1 of said columns.

37. The sales enhancement method of claim 35, the method further comprising the step of:
(g) filling said display elements staffing from a pre-determined row.

38. The sales enhancement method of claim 35, wherein at least a portion of unfilled elements of said display elements includes data representing credit point opportunities.

39. The sales enhancement method of claim 35, the method further comprising the step of:
(g) indicating a reward for fulfilling at least one of said opportunities.

40. A sales enhancement method comprising the steps of:
(a) providing a sales enhancement system including:
(i) an input mechanism;
(ii) a memory, associated with said input mechanism;
(iii) a processor associated with said memory;
(iv) a multi-dimensional display, associated with said processor, said display having a plurality of rows and a plurality of columns so as to form a plurality of display elements arranged in a matrix;
(b) inputting, into said system, selection information on a plurality of items selected by at least one patron making an order;
(c) storing said selection information in said memory;
(d) processing said information so as to classify, for each one of said plurality of items, an item type belonging to a plurality of item types, and (e) displaying each item of said plurality of items within said matrix such that:
  (i) each column of said plurality of columns contains a single item type of said item types, and
  (ii) each row of said plurality of rows contains a plurality of items belonging to different item types of said item types, such that at least one additional sales opportunity becomes a visually evident sales opportunity from a display of said matrix, and wherein said visually evident sales opportunity becomes visually evident when a column of said plurality of columns has fewer said filled display elements with respect to another column of said plurality of columns.

41. A sales enhancement method comprising the steps of:
  (a) providing a sales enhancement system including:
    (i) an input mechanism;
    (ii) a memory, associated with said input mechanism;
    (iii) a processor associated with said memory;
    (iv) a multi-dimensional display, associated with said processor, said display having a plurality of rows and a plurality of columns so as to form a plurality of display elements arranged in a matrix;
  (b) inputting, into said system, selection information on a plurality of items selected by at least one patron making an order;
  (c) storing said selection information in said memory;
  (d) processing said information so as to classify, for each one of said plurality of items, an item type belonging to a plurality of item types, and
  (e) displaying each item of said plurality of items within said matrix such that:
    (i) each column of said plurality of columns contains a single item type of said item types, and
    (ii) each row of said plurality of rows contains a plurality of items belonging to different hem types of said item types, such that at least one additional sales opportunity becomes a visually evident sales opportunity from a display of said matrix, and wherein said items are displayed in said display elements such that fulfilling said additional sales opportunity completes an unfinished pattern of said items in said matrix.

42. The sales enhancement method of claim 41, wherein said input mechanism includes a touch screen.

43. The sales enhancement method of claim 41, wherein said items are food products.

44. The sales enhancement method of claim 41, wherein said items are fast food items.

45. A sales enhancement method comprising the steps of:
  (a) providing a sales enhancement system including:
    (i) an input mechanism;
    (ii) a memory, associated with said input mechanism;
    (iii) a processor associated with said memory;
    (iv) a multi-dimensional display, associated with said processor, said display having a plurality of rows and a plurality of columns so as to form a plurality of display elements arranged in a matrix;
  (b) inputting, into said system, selection information on a plurality of items selected by at least one patron making an order;
  (c) storing said selection information in said memory;
  (d) processing said information so as to classify, for each one of said plurality of items, an item type belonging to a plurality of item types;
  (e) displaying each item of said plurality of items within said matrix such that:
    (i) each column of said plurality of columns contains a single item type of said item types, and
    (ii) each row of said plurality of rows contains a plurality of items belonging to different item types of said item types, such that at least one additional sales opportunity becomes a visually evident sales opportunity from a display of said matrix, (f) providing a pre-determined number (C) of said item types within C said columns, and
  (g) determining additional sale opportunities based on a difference between a number of patrons and a number of said filled elements in at least C−1 of said columns.

46. The sales enhancement method of claim 45, wherein said processing of said information includes determining a number of units associated with each of said item types.

* * * * *

UNITED STATES PATENT AND TRADEMARK OFFICE
CERTIFICATE OF CORRECTION

PATENT NO.        : 7,328,174 B2                                    Page 1 of 1
APPLICATION NO.  : 10/470950
DATED             : February 5, 2008
INVENTOR(S)       : Shy Baratz It is certified that error appears in the above-identified patent and that said Letters Patent is hereby corrected as shown below:

Title page, item

Related U.S. Application Data: Provisional application No. 60/265,869, filed on February 5, 2001 should be added.

Claim 1, column 18 should be corrected as follows:

Line 29: change "hems" to "items"

Claim 15, column 19 should be corrected as follows:

Line 40: change "sates" to "sales"

Claim 16, column 19 should be corrected as follows:

Line 42: change "sates" to "sales"

Claim 18, column 19 should be changed as follows:

Line 49: change "sates" to "sales"

Claim 41 (e (ii)), column 23 should be changed as follows:

Line 36: change "hem" to "item"

Signed and Sealed this

Twenty-seventh Day of May, 2008

JON W. DUDAS
*Director of the United States Patent and Trademark Office*